United States Patent [19]

Laamanen et al.

[11] Patent Number: 4,793,898

[45] Date of Patent: Dec. 27, 1988

[54] PROCESS FOR BLEACHING ORGANIC PEROXYACID COOKED MATERIAL WITH AN ALKALINE SOLUTION OF HYDROGEN PEROXIDE

[75] Inventors: Lauri A. Laamanen, Helsinki; Jorma J. Sundquist; Ilkka Y. P. Wartiovaara, both of Espoo; Seppo V. Kauliomäki; Kristiina J. Poppius, both of Helsinki, all of Finland

[73] Assignee: Oy Keskuslaboratorio - Centrallaboratorium Ab, Espoo, Finland

[21] Appl. No.: 936,344

[22] PCT Filed: Mar. 24, 1986

[86] PCT No.: PCT/FI86/00028

§ 371 Date: Nov. 17, 1986

§ 102(e) Date: Nov. 17, 1986

[87] PCT Pub. No.: WO86/05529

PCT Pub. Date: Sep. 25, 1986

[30] Foreign Application Priority Data

Mar. 22, 1985 [FI] Finland ................................. 850738
Feb. 11, 1986 [FI] Finland ................................. 860609

[51] Int. Cl.$^4$ .......................... D21C 3/04; D21C 9/16
[52] U.S. Cl. ........................................ 162/76; 162/78
[58] Field of Search ............................. 162/76, 78, 19

[56] References Cited

U.S. PATENT DOCUMENTS

| 3,193,445 | 7/1965 | Parker | 162/76 |
| 3,867,246 | 2/1975 | Hebbel | 162/76 |
| 4,400,237 | 8/1983 | Kruger | 162/76 |
| 4,462,864 | 7/1984 | Carles | 162/78 |

FOREIGN PATENT DOCUMENTS 821614  4/1981  U.S.S.R. ............................... 162/76

OTHER PUBLICATIONS

Rydholm, "*Pulping Processes*", Interscience Publishers, New York, 1967, pp. 916–917.
Kutney, "Hyrogen Peroxide: Stabilization of Bleaching Liquors"; Pulp & Paper Canada; 12–1985, presented Montreal 2-3-1984.

*Primary Examiner*—Steve Alvo
*Attorney, Agent, or Firm*—Birch, Stewart, Kolasch & Birch

[57] ABSTRACT

A lignocellulosic raw material is pulped with a cooking liquor containing organic peroxyacids, such as peroxyformic acid or peroxyacetic acid, and the defibered pulp is bleached with an alkaline solution containing hydrogen peroxide, the pH of which is at least 10 in the beginning of the treatment, and which is provided by adding to a sodium hydroxide solution, hydrogen peroxide in an amount which if calculated as a percent of the dry weight of the material coming to the treatment corresponds to from 0.20 to 0.80, preferably from 0.25 to 0.70 and most preferably from 0.45 to 0.65 times the kappa number of the pulp obtained from the previous stage of the process.

21 Claims, No Drawings

PROCESS FOR BLEACHING ORGANIC PEROXYACID COOKED MATERIAL WITH AN ALKALINE SOLUTION OF HYDROGEN PEROXIDE The present invention relates to a process for preparing bleached pulp out of lignocellulosic raw material. According to the present process, the raw-material is first treated with a pulping liquor containing oxidizing components, whereupon the pulp is bleached.

The preparation of fully bleached pulp is nowadays carried out by means of methods which call for the use of sulphur- and chlorine-containing chemicals. These materials have a detrimental influence on the environment, the minimization of which forms an important cost factor in industry. The environmental requirements of ever increasing stringency are obviously going to increase said costs even further in the future. It is easily conceivable that the efforts to provide less contaminating pulping processes during the last few years have been the objects of constant interest.

Non-polluting pulping has been aimed at by using closed processes. Furthermore, there have been efforts to find chemicals, the use of which is accompanied by a diminished adverse environmental influence, when compared with conventional pulping chemicals, and which would allow the process to be closed even better.

The closing of the process in the first stage of conventional pulping, i.e. during cooking has, to a rather large degree already been achieved for the present pulping processes. This is true especially for the chemical circulation of the main process, i.e. the kraft process. In this context, the formation of malodorous sulphur-containing volatile compounds which exhibit an adverse environmental influence is, however, still a problem.

The closing of the process of the second stage of pulping, i.e. bleaching, is difficult. The present bleaching processes are mainly based on the use of chlorine and compounds thereof, but 100% recirculation of bleaching waste-liqours containing chlorine compounds in the process has proved to be very difficult mainly due to corrosion problems. The various detrimental chlorine compounds formed during bleaching are therefore, to rather a large extent, emitted to the environment.

In pulping, the chemicals which cause a minimum of pollution and which are preferable when it comes to the closing of the process, have met with ever increasing interest, as the possibilities of the present pulping processes for meeting the stricter environmental requirements have been shown to be limited. Industrial applications have not yet been reached, although the matter is being largely investigated around the world today. The new methods are expensive and this has frequently been mentioned as the reason for their not being widely used.

Pulping which causes a minimum of environmental pollution is best reached when the chemicals used therein contain only carbon, hydrogen, and oxygen. Many of the new methods tested do not, however, fulfil this requirement; they may contain e.g. nitrogen which is an unpredictable element when considering its environmental influence. It may even prove to be very troublesome.

The first stage of pulping, i.e. cooking, using chemicals containing carbon, hydrogen, and oxygen only, has mainly been investigated in the connection with so-called organosolv pulping methods. Said methods are based on the use of organic solvents. These usually contain some compound which is called a catalyst, which enhances the degradation of lignin and the conversion thereof into a dissolving form. The drawback of the organosolv-methods lies in their relatively low delignification capacity and the difficulty of pulping softwood. Furthermore, the catalysts often times contains undesired elements, such as chlorine or sulphur, which make the non-polluting character of the method questionable wheh larger amounts of catalysts are employed.

However, it has been discovered that the dissolving of lignin in certain organosolv-solvents, e.g., carboxylic acids, may be significantly increased when a lignin-oxidizing chemical, e.g. hydrogen peroxide, is used instead of a catalyst. If hydrogen peroxide is added to a liquid carboxylic acid, such as acetic or formic acid, lignin is oxidized to dissolve in the carboxylic acid. Hydrogen peroxide forms together with the carboxylic acids, peroxyacids, which in an acid system have a strong influence on lignin but much less influence on the other components of wood. A selective delignification is thus achieved by means of which the wood fibres may be separated from each other, i.e. pulp is obtained.

The use of a mixture of carboxylic acid/peroxide in the preparation of paper and paperboard pulp has been disclosed in the SU Patent Specification No. 761647 published in 1980. According to said patent, cooking is carried out at normal pressure at a temperature below 100° C. No data as to the species of wood nor to the bleaching of the pulp are given. Due to the huge amount of peroxide required in the pulping in accordance with said patent, a later patent (SU Patent Specification No. 821614, published in 1981) arrived at a two stage process, wherein the wood chips are initially treated with carboxylic acid without peroxide at a temperature of 90° C. to 95° C., whereupon the acid/peroxide treatment is conducted. No more detailed data as to the wood species used, or of the bleaching of the pulp are given. Another two stage pulping process wherein the raw material is treated with carboxylic acid, is disclosed in U.S. Pat. No. 3,458,394. A pulping liquor containing acetic acid and chlorine dioxide is used in said process. The lignin separated and reacted due to the action of the peracetic acid formed in the liquor is removed from the pulp during the second stage of the pulping by means of a dilute alkali solution. According to the publication, the yield is from 75.6% to 86.0%.

According to the processes disclosed in said patents it is possible to obtain chemical defibration of the wood, i.e. to obtain pulp. However, the product as such is not suitable for the preparation of most of the paper and paperboard qualities due to the insufficient degree of brightness. The brightness of the pulp has to be raised to a required level by means of conventional bleaching methods employing chlorine chemicals. This results, however, in the formation of polluting chlorine compounds, whereby the advantage over conventional pulping offered by the carboxylic acid/peroxide-process is lost.

Chlorine-free bleaching methods are known per se. Thus, during the recent years great expectations have been focused on ozone bleaching employing as its main bleaching chemical an ozone containing gas dissolved in a suitable medium. Hydrogen peroxide has been used in the bleaching of cotton, linen and wool based textiles for a long time. It has also to some extent been used in the bleaching of mechanical pulp and for the bleaching of pulp from sulphite and sulphate processes. In the last mentioned applications, it has not been used to any larger extent, since it is not possible to obtain as high a brightness or viscosity as in multistage chlorine bleaching. Said methods are exemplified by the solution mentioned in the FI Patent Specification No. 68685. Said publication discloses a bleaching process in two stages for bleaching of sulphite pulp, in the first stage of which hydrogen peroxide (0.2–3.0% by weight) and peracid prepared from an organic carboxylic acid (0.1–5.0% by weight) is employed, and in the second stage of which an alkaline peroxide treatment is conducted by adding aqueous alkali to the liquor obtained from the first stage.

One object of the present invention is to offset the drawbacks associated with the known pulping and bleaching processes and to provide an entirely novel process for preparing pulp directly out of lignocellulosic raw material essentially in two stages. The invention is based upon using in a first stage a pulping liquor containing peroxyacids derived from carboxylic acids and subsequently treating the defibrated pulp thus obtained with an alkaline solution of peroxyacids in a second stage.

The liquor employed in the first stage containing peroxyacids is preferably provided by the addition of hydrogen peroxide to an organic carboxylic acid, e.g. formic, acetic, propionic, or butyric acid.

The process according to the invention forms, in spite of the provision of two stages, an integrated delignification system, the stages of which function synergistically. In this context it should be mentioned that it is not possible to raise the brightness of, e.g. unbleached pulp from the kraft process to as high a level as that of the carboxylic acid/peroxide-pulp by separately employing the peroxide bleaching process of the present invention. As shown in the examples 1A and 1B hereinafter, the brightness of the pulp in accordance with the present invention is about twice as high as that of the unbleached kraft pulp after treatment with an alkaline peroxide solution.

By means of the present invention, significant advantages are achieved. Thus, fully bleached pulp is obtained by using delignification chemicals containing carbon, hydrogen and oxygen only. The sodium or corresponding alkali or alkaline earth metal present in the alkali added in the second stage is the only inorganic material to be added. Environmentally polluting chemicals are not used at all. The pulps obtained exhibit high brightness and sufficiently high viscosity. The yield is comparable to that of bleached kraft pulp.

The apparatus required by the process is simple. The acid stage as well as the alkaline stage may be conducted at normal pressure, since there is no need for raising the reaction temperatures above the boiling point of the mixture. The low temperatures result in huge savings in energy consumption.

The present delignification process in two stages may be used for the delignification of all kinds of lignocellulosic materials. It is particulary well suited for chips of hardwood and softwood commonly employed in pulping. Delignification of hardwood proceeds somewhat better than that of spruce and pine chips. Annual plants, grass, straw and bagasse may also be used as raw materials.

The first stage of the process, i.e. the peroxyacid stage, is preferably conducted by using a mixture of some liquid carboxylic acid and hydrogen peroxide. As known, due to the influence of hydrogen peroxide, the carboxylic acids are oxidized to peroxyacids which form the active agents of the cooking liquor.

The peroxyacid reacts with lignin, and the oxidization products formed from this reaction dissolve in the solution of carboxylic acids. The various carboxylic acid have a different capability of forming peroxyacids, i.e. their oxidative capacity differs. In principle, no carboxylic acid may be excluded from the process. Aliphatic as well as aromatic acids are suitable. In practice, formic and acetic acids are particulary preferred, of which the first mentioned acid more easily forms peroxyacid, and it is therefore in this sense preferred. The pulp obtained when using formic acid in the first stage is darker than that obtained by using acetic acid, on the other hand, the viscosity of the pulp is lower when the last-mentioned acid has been employed. In addition to aforementioned acids, propionic and butyric acids may also be used.

The formation of peroxyacids may be enhanced by using some known catalysts, e.g. sulphuric, phosphoric or boric acids, but this is neither necessary nor always even preferable. It has been discovered that, e.g., sulphuric acid may degrade the carbohydrates during the cooking, which leads to a decreased visosity of the pulp.

In the process, the concentration of the carboxylic acid employed is in the range of 40...100%, preferably in the range of 70...100%, the liquid-to-wood ratio being from 2:1 up to 10:1. The ratio 8:1 normally used in pulping may be used. However, it is preferable to use a smaller liquid-ratio, e.g. 4:1, because said ratio makes it possible to decrease the required amount of hydrogen peroxide and enhance the progress of the delignification reaction. Pulp yield and brightness of the pulp are also improved by a smaller liquid-to-wood ratio. On one hand, when it comes to recovery of the formic acid, it would be preferable to use an azeotropic formic acid-water solution, containing 80% of formic acid, but on the other hand, when it comes to delignification, it is preferable to use an acid containing as small an amount of water as possible.

Alternatively, the peroxyacids may be formed in the solution in some other known manner, e.g. by reacting the corresponding aldehydes with molecular oxygen or an oxygen-ozone mixture. In this case, the carboxylic acids needed for the dissolution of the reaction products are formed as decomposition products of the peroxyacids. The peroxyacids may also be formed in the cooking liquor prior to the addition of the cellulosic raw material.

The peroxide used may comprise, e.g., an industrially prepared hydrogen peroxide solution, the concentration of which is 50%. The concentration of the peroxide may, however, be higher or lower, i.e. from about 30% up to 90% by weight. The amount used varies within a large range depending on the extent to which the delignification is to be conducted during the acid stage. It is preferable to achieve a defibration of the chips before the second stage. The amount of peroxide used in the examples has been varied from 5% up to 60% based on the oven dry (o.d.) weight of the chips, but said values are not absolute limits. It has been ascertained that, especially for birch raw material, delignification is achieved when using a liquor containing even 1% by weight of hydrogen peroxide. Due to the relatively high price of the hydrogen, it is preferable to use as small amount thereof as possible. The usefulness of the process is demonstrated by the fact that as little as 20% hydrogen peroxide gives a birch pulp with a kappa number on the order of about 20. By carboxylic acid pretreatment of the raw material as described hereinafter, it is possible to further decrease the consumption of the hydrogen peroxide without letting the kappa number of the pulp rise to a higher level.

Water present in the carboxylic acid, in the peroxide as well as in the chips is introduced into the cooking liquor. As mentioned above, the water content of the acid influences especially the dissolution of the oxidized lignin. Thus, it should be kept as low as possible.

The acid peroxy-treatment may be conducted at any temperature between ambient temperature and the boiling point of the system used. However, high temperatures are not suitable due to the fact that the peroxyacids decompose when the temperature is raised, whereby the delignification capacity of the cooking liquor is lost. Thus, the oxidizing capacity of a pure formic acid/peroxide mixture disappears altogether within an hour when the temperature is 80° C. The oxidizing capacity of the mixture of acetic acid and peroxide is conserved rather a long time even at 95° C., but this is due to the fact that the rate of peroxyacid formation is slower for acetic acid than for formic acid. Accordingly, the cooking temperature to be selected depends on the acid used. For formic acid the temperature is preferably in the range of about 70°–90° C., and for acetic acid somewhat higher. For propionic and butyric acids still higher temperatures may be used.

It is also possible to carry out the cooking such that the cooking liquor is heated for some time at a higher temperature, e.g. at about 90° C., whereupon the actual cooking is conducted at a lower temperature of, e.g., from 70° C. up to 75° C.

Cooking time may also vary within a large range depending on the temperature. At ambient temperature the treatment lasts for several days, whereas it may be as short as one-half an hour when conducted near to the boiling point of water. Too long a treatment time at high temperature lowers the viscosity of the pulp. Depending on the optional pretreatment, the acid used and the cooking temperature, the cooking time is from 2 hours up to 10 hours, preferably from 4 hours up to 6 hours.

It is preferable to impregnate the chips with the treatment liquor either in vacuo or by means of pressure before starting the actual treatment. The impregnation may be conducted at ambient temperature. It has been discovered that a delignifying pretreatment of the chips decreases considerably the amount of hydrogen peroxide needed in the peroxyacid treatment stage, thus reducing the actual cooking time. This is true especially for birch raw material. The pretreatment may be conducted at ambient temperature or preferably at increased temperature by means of some chemical, e.g. an alkali solution or preferably formic acid as taught by the SU Patent Specification No. 821614. The acid treatment is carried out, e.g., at the boiling point of the acid, whereat prolonging of the pretreatment time lowers the kappa number. As the pretreatment acid, spent peroxyacid cooking liquor may be used. In an alkaline pretreatment the alkali solution used may be the same as in the second phase of the process. By means of the alkali treatment it is possible to reach an extremely high brightness.

A preferred embodiment of the first stage of the invention when using softwood chips, comprises pulping the chips first in peroxyformic acid, thereafter in formic acid and subsequently again in peroxyformic acid. Delignified pulp (kappa number on the order of 10) is easily obtained by said procedure. Peroxyacetic acid pulping may also be conducted in a similar manner.

After the first phase, the defibrated pulp is preferably washed with water such that the pulp obtained is at least approximately neutral. The acid of the spent liquor obtained from this phase may be re-used after recovery. During recovery the acid is separated from the solid substance, e.g., by means of distillation. Formic acid and water form an azeotropic mixture which boils already at 107° C. This azeotropic mixture contains about 80% of formic acid and may be re-used as such.

The second phase of the present pulping process, the alkaline peroxide treatment, may be conducted by using a water-soluble alkali and hydrogen peroxide. The amount of the alkali depends on the amount consumed during the treatment. The pH value of the treatment liquor shall initially exceed 10, the required amount being dependent upon the amount required for reaching said pH level. It has been ascertained that acceptable results are reached already at pH values slightly in excess of 10. Higher pH values may of course also be employed, but when it comes to the bleaching result or the economy of the chemicals, it is not sensible to increase the alkalinity to a high level. It has been further ascertained that the amounts of alkali and hydrogen peroxide are somewhat interdependent. The more hydrogen peroxide is used, the more alkali is needed. During the treatment the pH of the liquor decreases to some extent, usually about one pH unit.

The alkaline peroxide phase may also be accomplished such that the calculated amount of peroxide is used in several portions, e.g. in 3 to 6 portions. The bleaching liquor is removed from the pulp after each phase. When the bleaching is carried out as a conventional bleaching, the pulp is preferably washed between the phases of treatment, but if the bleaching is conducted as a so-called displacement bleaching, this is not necessary. A multiphase bleaching has been discovered to have a preferable influence on the brightness of the pulp. The viscosity of the pulp remains high at the same time.

The alkali used may be selected from the group consisting of alkali metal and earth alkali metal hydroxides, carbonates and bicarbonates. Alkali metal hydroxides and carbonates are preferred, particulary preferred are sodium hydroxide and sodium carbonate. The alkali may also comprise mixtures of said compounds. It is preferable to use sodium hydroxide because minor amounts result in achieving the required pH value. Sodium carbonate on the other hand is suitable in the sense that it may be obtained by calcination of the spent liquor from the alkali phase. Because the pulp treated in the second phase is almost neutral, no carbon-dioxide is evolved from the carbonate, which might make the treatment more difficult.

The temperature of the treatment may vary, but e.g. the common temperature, 80° C., used in the peroxide bleaching of conventional pulps may also be used in this context. The duration of the treatment varies according to the temperature, but at 80° C. the suitable time is about 1 hour. Generally, a peroxide residue after this stage in the order of 0.2% of the pulp should be the objective.

The required amount of peroxide depends on the kappa number, i.e. the lignin content, of the pulp coming to said stage. Generally, the amount is from 1% up to 20%. It has been discovered empirically that the added amount of hydrogen calculated as percent of the dry weigh of the matter coming to the treatment stage amounts to about 0.20 to 0.80, preferably 0.25 to 0.70, most preferably 0.45 to 0.65 times the kappa number of the pulp from the first phase.

Within the scope of the present invention, the second phase may be accomplished in a different manner also. Thus, the alkali and the hydrogen peroxide required may be substituted by a peroxide derivative., e.g. a metal peroxide, preferably sodium peroxide, which dissolves in water the form hydroxide and hydrogen peroxide.

To prevent heavy metals possibly introduced into the system from exhibiting a hydrogen peroxide decomposing effect one or a few peroxide stabilizers may be added. During the peroxyacid stage citric acid may be used, whereas e.g. diethylene triaminepentaacetic (DTPA) or/and one magnesium salt, e.g. Mg sulfate, may be used during the alkaline peroxide stage. The amount of the stabilizer is preferably on the order of a few promilles.

The invention will now be examined in more detail by means of the following non-limitative practical examples. The brightness values indicated in the examples have been determined according to the SCAN C-11 method and the viscosity values correspondingly according to the SCAN C-15 method. The kappa numbers have been measured by the SCAN C-1:77 method. All of the indicated percent amounts have been calculated per weight.

EXAMPLE 1A 50 g pine chips (dry matter 92%) calculated od., was admixed with 250 ml formic acid, 75 ml water, and 60 ml 50% hydrogen peroxide solution (corresponding to 60% peroxide of the dry weight of the chips). The chips were impregnated with the mixture in vacuo for 30 minutes, whereupon the temperature was raised to 70° C. within 2.5 hours. The cooking was carried out at a cooking temperature of 70° C. to 75° C. for 2.5 hours. The cooking liquor was removed from the soft chips by filtration, the chips were washed to some extent with water, whereupon it was defibered with a Waring Blendor laboratory blender. The defibration time was 30 sec using the smallest effect of the apparatus. After the defibration the pulp was washed with water and the shives (0.8%) were removed. The kappa number of the pulp was 11.3.

The pulp dried at ambient temperature was treated with an alkaline hydrogen peroxide solution at 80° C. for 2 hours, at 10 percent stock, the added amount of NaOH being 5% and the amount of hydrogen peroxide being 7.3% (the amount of peroxide=0.65×kappa number). The initial pH value was 10.3, and it decreased to a value of 9.4 during the treatment. The stabilizing agent comprised 0.2% of DTPA. After the treatment, the pulp was washed and acid was added, whereupon the pulp was dried. The final brightness of the pulp was 89.0%, the viscosity 830 cm$^3$/g, and the pulp yield in percent of the raw material 44.4%.

EXAMPLE 1B (control)

Unbleached spruce kraft pulp, the kappa number of which was 31.9, was bleached at 10 percent stock at 80° C. for 30 minutes. The amount of NaOH was 3% of the pulp, the amount of hydrogen peroxide being 20.7% (=0.65×kappa number), and the pH value 10.5. In spite of the short treatment time the peroxide was completely exhausted. The brightness of the pulp thus obtained was 46.5% and the viscosity 750 cm$^3$/g.

EXAMPLE 2

As example 1A, but birch chips (dry matter 90%) were used instead of pine. The cooking was carried out departing from the foregoing such that the temperature was raised to 70° C. during 5 hours, whereinafter the temperature was raised to 80° C. within one hour and the cooking was finished. The shives amounted to 3.1%, and the kappa number of the pulp was 5.3. The alkaline hydrogen peroxide treatment was conducted at 80° C., the duration being one hour. The stock was 10% and the amount of NaOH was 5% and of hydrogen peroxide 3% (peroxide=0.57×kappa number). The pH of the solution was 10.4. Analysis of the pulp: brightness 89.0%, viscosity 1050 cm$^3$/g.

EXAMPLE 3

As example 1, but spruce chips (dry matter 93%) was instead of pine. The temperature of the cooking was raised to 80° C. within 2.5 hours, and left at said temperature for 2.5 hours. Shives: 11.4% and the kappa number of the pulp 14.0. The alkaline peroxide treatment was conducted at 10 percent stock during 2 hours. The added amounts were: 5% of NaOH and 4.5% of hydrogen peroxide (=0.32×Kappa number). The pH of the solution was 10.8%. Analysis of the pulp: brightness 84.3%, viscosity 920 cm$^3$/g and pulp yield 43.1% (calculated on the wood).

EXAMPLE 4

As example 1, but acetic acid was used instead of formic acid. During the cooking the temperature was raised to 85° C. within 1.5 hours, and the cooking liquor was left at said temperature for 2.5 hours. Shives: 5.5% and the kappa number of the pulp 18. The alkaline peroxide treatment was conducted as in example 3, the amount of hydrogen peroxide 0.25×kappa number, the pH was 10.9%. Analysis of the pulp: brightness 85.2%, viscosity 740 cm$^3$/g and the pulp yield 48.8% (calculated on the wood).

EXAMPLE 5

As example 1, but the pine chips was pretreated before the peroxide cooking for one hour at 90° C. with 80% formic acid. The cooking was carried out by raising the temperature within 3 hours to 75° C., whereupon the cooking was finished. There were no shives. The kappa number was 7.3. The alkaline hydrogen peroxide treatment was conducted at 80° C., the duration being two hours at 10% stock. The amount of NaOH was 5% and the amount of hydrogen peroxide 4.5% (=0.62×kappa number). The pH of the solution was 10.1. Analysis of the pulp: brightness 86.0%, viscosity 900 cm$^3$/g and the pulp yield (calculated on wood) 43.9%.

EXAMPLE 6

As example 2, but the birch chips were pretreated prior to the peroxide cooking for one hour at 100° C. with an alkali solution containing 6% o.d. wood NaOH. The cooking was carried out using the peroxide application rate 20% per o.d. wood. The temperature was raised within 4 hours 20 minutes to 75° C., the cooking being maintained at 75° C. to 80° C. for 2 hours. The amount of shives was 12.6%, and the kappa number was 14.5. The alkaline peroxide treatment was conducted at 10 percent stock during 1 hour. The NaOH application rate was 6%, the amount of hydrogen peroxide being 8% (=0.55×the kappa number). The pH of the solution was 10.8. Analysis of the pulp gave: brightness 86.5%, viscosity 1000 cm$^3$/g and the pulp yield 43.2% (calculated on the wood).

EXAMPLE 7

As example 6, but the temperature of the alkaline peroxide treatment was 60° C. and the duration time 2 hours. Analysis of the pulp gave: brightness 86.5%, viscosity 1080 cm$^3$/g and the pulp yield 43.5% (calculated on the wood).

EXAMPLE 8

As example 2, but the liquor-to-wood ratio was lowered and the amount of hydrogen peroxide was decreased. 50 g birch chips (dry matter 90%) calculated o.d., was admixed with 200 ml formic acid. Water was not added at all, and the amount of 50% hydrogen peroxide solution was decreased from 60 ml (in example 2) to 10 ml, which corresponds to 10% peroxide of the dry weight of the chips. The liquor to wood ratio was thus 4:1 (instead of 8:1). The reaction mixture was heated to 78° C., maintained at said temperature for 3.5 hours. The kappa number of the pulp was 51.4, the viscosity 1170 cm$^3$/g, the screened yield being 52.9% and the amount of shives 7.2%.

The pulp obtained was bleached with an alkaline solution of hydrogen peroxide such that the calculated amount of hydrogen peroxide, 30.8% of the pulp (16.3% o.d. wood, i.e. 0.60×the kappa number), was added in three portions. The temperature during all stages was 80° C., the reaction time 1 hour, and the initial pH value 10.5. The stabilizer added comprised 0.2% DTPA. The brightness of the pulp was 90.3.

The total consumption of hydrogen peroxide was in this example 10+16.3%, i.e. 26.3% of the o.d. chips.

EXAMPLE 9

50 g pine chips were refluxed in 250 ml of 100% formic acid for three hours. The pretreatment liquor was removed, the peroxyformic acid cooking was subsequently carried out with a cooking liquor of 200 ml 100% formic acid to which 10% hydrogen peroxide had been added. The temperature of the cooking was raised to 80° C., the total cooking time being three hours. After the cooking the pulp was washed with water until the washing water was neutral. The kappa number was 31.1 at this stage, the viscosity was 1060 cm$^3$/g, the brightness 19.5 and the yield 43.3. There were scarcely any shives in the pulp.

Test carried out on the pulp showed that it was easily bleached by means of an alkali hydrogen peroxide solution.

EXAMPLE 10

As example 8, but the amount of peroxide used was only 5% of the chips, i.e. 5 ml of 50% hydrogen peroxide was added. The kappa number of the pulp was 62.2, the viscosity 1070 cm$^3$/g, the screened yield was 45.8% and the amount of shives 19.7.

The pulp obtained was bleached as described in example 8, the calculated amount of hydrogen peroxide, 28% of the pulp (12.8% o.d. wood, i.e. 0.45×the kappa number), was also this time added in three portions. The brightness of the pulp was 87.0%.

The total consumption of hydrogen peroxide in this example was 5+12.8%, i.e. 17.8% of the o.d. chips.

EXAMPLE 11

As example 6, but the birch chips were pretreated before the peroxyacid cooking by boiling them for 3 hours in 80% formic acid under reflux conditions. The cooking liquor was removed, the peroxyformic acid cooking being subsequently carried out employing 85% formic acid to which 5% hydrogen peroxide of o.d. wood only had been added. The temperature was raised in 50 minutes to 80° C. and maintained at said temperature for 1 hour. After the cooking the pulp was washed to neutrality with the required amount of hot water. The kappa number of the pulp was at this stage 14.7 and the viscosity 1180 cm$^3$/g and the yield 42.3%.

The pulp obtained was bleached with an alkaline solution of hydrogen peroxide such that the calculated amount of hydrogen peroxide, 8% of the pulp (3.4% o.d. wood, i.e. 0.55×the kappa number), was added in four portions: the duration of the first two stages was 1 hour, the duration of the two last ones was 2 hours. The temperature during all stages was 80° C., and the initial pH value 10.7. The stabilizer added comprised 0.2% DTPA and 0.5% (calculated on o.d. wood) Mg sulfate. The brightness of the pulp obtained was 90.1%, and the viscosity 1140 cm$^3$/g.

The total consumption of hydrogen peroxide was in this example 5+3.4%, i.e. 8.4% of the o.d. chips only.

EXAMPLE 12

50 g spruce chips (dry matter 92.6%) calculated per o.d. wood, were heated in a mixture of 200 ml 100% formic acid, and 5 ml 50% hydrogen peroxide. The total time of heating was 2 hours 45 minutes and the maximum temperature 75° C. The spent liquor was filtered off and the somewhat softened chips were refluxed for 3 hours in 250 ml of 100% formic acid. The cooking liquor was removed and the chips were defibred in formic acid. Subsequently, an other peroxyacid cooking was conducted, comprising as cooking liquor 200 ml of 100% formic acid, to which 5% of hydrogen peroxide had been added. The mixture was heated for 3 hours 30 minutes, the maximum temperature being 75° C. After the cooking, the pulp was first washed with formic acid and thereafter with water. The kappa number of the pulp was 9.0, the viscosity 980, the brightness 35.1 and the screened yield 41.4%. The amount of shieves was only 0.2%.

The pulp obtained was bleached with an alkaline hydrogen peroxide solution such that the calculated amount of hydrogen peroxide, 6% of the pulp (2.5% o.d. wood), was added in three portions. The duration of the first stage was 1 hour, of the second one 2 hours, and of the third one 3 hours. The temperature was 80° C. The stabilizers were analogous to those employed in example 11. The brightness of the pulp obtained was 90.5, and the viscosity 940.

The total consumption of hydrogen peroxide was in this example 10+2.5%, i.e. 12.5% of the o.d. chips.

What is claimed is:

1. A sulfur free and chlorine free process for preparing bleached Chemically defibered pulp from lignocellulosic raw material, wherein said material is first treated with a cooking liquor containing an oxidizing component to form a pulp, whereinafter the pulp is bleached, which comprises:

(A) chemically defibering the lignocellulosic raw material by means of a cooking liquor comprising an active organic acid selected from the group consisting of peroxyformic acid and peroxyacetic acid to form a chemically defibered pulp having a Kappa number of 62.2 or less, and (B) bleaching the chemically defibered pulp with an alkaline solution comprising hydrogen peroxide in an amount which when calculated as a percent of the dry weight of the material coming to the treatment, corresponds to from 0.20 to 0.80 times the kappa number of the chemically defibered pulp obtained from stage A of the process, at a pH of at least 10 in the initial stages of the bleaching, to form a bleached chemically defibered pulp having a brightness of at least 84.3%.

2. The process as claimed in claim 1, wherein the cooking liquor used in stage A is provided by adding at least 1 weight percent of hydrogen peroxide calculated on oven dry wood to from 40 to 100 weight percent of formic acid or acetic acid.

3. The process as claimed in claims 1 or 2, wherein a liquor-to-wood ratio is maintained at a value in the range of 2:1–10:1.

4. The process as claimed in claims 1 or 2, wherein formic acid or acetic acid is recovered from spent cooking liquor of stage A and reused to from the cooking liquor.

5. The process as claimed in claim 4, wherein formic acid is recovered as an azeotropic mixture of formic acid and water in which the concentration of the formic acid is about 80%, and wherein the recovery comprises distilling the spent liquor obtained form stage A.

6. The process as claimed in claim 1, wherein the raw material is pulped in stage A with the liquor in two separate stages and the raw material between said stages is treated with the corresponding formic acid or acetic the boiling point thereof.

7. The process as claimed in claim 1, wherein the raw material is pretreated prior to stage A with formic acid or acetic acid at a termperature corresponding to the boiling point of the respective acid.

8. The process as claimed in claim 7, wherein formic acid is used in the pretreatment, wherein the spent liquor containing formic acid obtained from stage A is used as the pretreatment acid.

9. The process as claimed in anyone of claims 1, 2 or 6, wherein prior to stage A, the raw material is pretreated with the aqueous alkaline solution used in stage B at a temperature of about 100° C.

10. The process as claimed in claim 1, wherein the alkaline solution used in stage B contains a member selected from the group consisting of sodium hydroxide, sodium carbonate and a combination thereof.

11. The process as claimed in claim 2, wherein the calculated amount of hydrogen peroxide is added in stage B in a plurality of portions, with the bleaching solution being removed after the termination of each stage, whereupon the bleached chemically defibered pulp is optionally washed.

12. The process as claimed in claim 1, wherein the temperature of the cooking liquor of stage A is initially maintained at a temperature of about 90° C., whereupon the actual cooking is conducted at a lower temperature of about 70° to 75° C.

13. The process as claimed in claim 2, wherein citric acid is added to stage A as a stabilizer for the hydrogen peroxide and a member selected from the group consisting of diethylenetriamine pentaacetic acid (DTPA), magnesium sulfate and mixtures thereof are added to stage B as a stabilizer.

14. The process as claimed in claim 2, wherein the formation of the active organic acid is enhanced by using a catalyst selected from the group consisting of sulfuric acid, phosphoric acid and boric acid.

15. The process of claimed in claim 1, wherein the alkaline solution comprises from 30 to 90% by weight of hydrogen peroxide.

16. The process of claimed in claim 2, wherein, in the chemically defibering stage A the amount of peroxide used varies from 5 to 60%, based on the oven dry weight of the chips.

17. The process as claimed in claim 1, wherein the Kappa number of the chemically defibered pulp obtained from stage A is about 10.

18. The process as claimed in claim 2, wherein the concentration of the formic acid or acetic acid is from 70 to 100 weight percent.

19. The process as claimed in claim 1, wherein a liquor-to-wood ratio is maintained at a value of from 4:1 to 8:1.

20. The process as claimed in claim 2, wherein about 5 to 20 weight percent of hydrogen peroxide is mixed with formic acid or acetic acid to form the active organic acid.

21. The process as claimed in claim 1, wherein, the amount of the hydrogen peroxide of the alkaline solution added to the chemically defibered pulp corresponds to 0.45 to 0.65 times the kappa number of the chemically defibered pulp obtained from stage A of the process.

* * * * *